United States Patent [19]

Lurito

[11] Patent Number: 4,526,550
[45] Date of Patent: Jul. 2, 1985

[54] COMBINATION SYSTEM AND QUESTION AND ANSWER MATCHING GAME

[76] Inventor: Don J. Lurito, Box 181, MIT Branch, Cambridge, Mass. 02139

[21] Appl. No.: 570,613

[22] Filed: Jan. 13, 1984

[51] Int. Cl.³ .............................................. G09B 1/10
[52] U.S. Cl. ..................................... 434/340; 70/286; 273/157 R; 434/200; 434/201; 434/345
[58] Field of Search ............... 434/167, 169, 171, 172, 434/200, 201, 209, 334, 340, 345; 70/1, 266, 286; 273/157 R

[56] References Cited

U.S. PATENT DOCUMENTS 3,469,325 9/1969 Greenberg ........................... 434/167
3,805,416 4/1974 Plefkey ................................. 434/169

FOREIGN PATENT DOCUMENTS 721010 11/1965 Canada ................................. 434/209

Primary Examiner—William H. Grieb
Attorney, Agent, or Firm—McCormick, Paulding & Huber

[57] ABSTRACT

A combination system such as may, for example, be embodied in a matching game or instructional device or in a set of locks and keys consists of a number of receivers and an associated number of plugs with both the receivers and the plugs having cooperable coding features coded according to unique rules, derivable from N-dimensional geometry, assuring a desired form of cooperation between a plug inserted in a receiver only when the code of such plug matches the code of the receiver.

10 Claims, 7 Drawing Figures

(Code-2,1,3,1)

(Code - 1, 3, 2, 1)

(Code - 3, 2, 0, 2)

AVAILABLE COMBINATIONS FOR N=4, X=3 AND K=7

| COMB. NUMBER | PRONGS | | | | K |
|---|---|---|---|---|---|
| | A | B | C | D | |
| 1 | 0 | 1 | 3 | 3 | 7 |
| 2 | 0 | 2 | 2 | 3 | 7 |
| 3 | 0 | 2 | 3 | 2 | 7 |
| 4 | 0 | 3 | 1 | 3 | 7 |
| 5 | 0 | 3 | 3 | 1 | 7 |
| 6 | 0 | 3 | 2 | 2 | 7 |
| 7 | 1 | 0 | 3 | 3 | 7 |
| 8 | 2 | 0 | 2 | 3 | 7 |
| 9 | 2 | 0 | 3 | 2 | 7 |
| 10 | 3 | 0 | 1 | 3 | 7 |
| 11 | 3 | 0 | 3 | 1 | 7 |
| 12 | 3 | 0 | 2 | 2 | 7 |
| 13 | 1 | 3 | 0 | 3 | 7 |
| 14 | 2 | 2 | 0 | 3 | 7 |
| 15 | 2 | 3 | 0 | 2 | 7 |
| 16 | 3 | 1 | 0 | 3 | 7 |
| 17 | 3 | 3 | 0 | 1 | 7 |
| 18 | 3 | 2 | 0 | 2 | 7 |
| 19 | 1 | 3 | 3 | 0 | 7 |
| 20 | 2 | 2 | 3 | 0 | 7 |
| 21 | 2 | 3 | 2 | 0 | 7 |
| 22 | 3 | 1 | 3 | 0 | 7 |
| 23 | 3 | 3 | 1 | 0 | 7 |
| 24 | 3 | 2 | 2 | 0 | 7 |
| 25 | 1 | 1 | 2 | 3 | 7 |
| 26 | 1 | 1 | 3 | 2 | 7 |
| 27 | 1 | 2 | 2 | 2 | 7 |
| 28 | 1 | 2 | 3 | 1 | 7 |
| 29 | 1 | 3 | 2 | 1 | 7 |
| 30 | 1 | 3 | 1 | 2 | 7 |
| 31 | 1 | 1 | 2 | 3 | 7 |
| 32 | 1 | 1 | 3 | 2 | 7 |
| 33 | 2 | 1 | 2 | 2 | 7 |
| 34 | 2 | 1 | 3 | 1 | 7 |
| 35 | 3 | 1 | 2 | 1 | 7 |
| 36 | 3 | 1 | 1 | 2 | 7 |
| 37 | 1 | 2 | 1 | 3 | 7 |
| 38 | 1 | 3 | 1 | 2 | 7 |
| 39 | 2 | 2 | 1 | 2 | 7 |
| 40 | 2 | 3 | 1 | 1 | 7 |
| 41 | 3 | 2 | 1 | 1 | 7 |
| 42 | 3 | 1 | 1 | 2 | 7 |
| 43 | 1 | 2 | 3 | 1 | 7 |
| 44 | 1 | 3 | 2 | 1 | 7 |
| 45 | 2 | 2 | 2 | 1 | 7 |
| 46 | 2 | 3 | 1 | 1 | 7 |
| 47 | 3 | 2 | 1 | 1 | 7 |
| 48 | 3 | 1 | 2 | 1 | 7 |

FIG. 5

COMBINATION SYSTEM AND QUESTION AND ANSWER MATCHING GAME

BACKGROUND OF THE INVENTION

This invention relates to a combination system of the type comprising a first set of parts each having a combinational code and a second set of parts each having a combinational code wherein the second parts may be randomly coupled on a one-to-one basis with the first parts with a given condition occurring only when the two coupled first and second parts have the same codes, and deals more particularly with such a combination system wherein the parts are coded according to a unique set of rules permitting a vast number of different combinations while assuring that the stated condition will be achieved only when two coupled first and second parts have the same code.

The combination system of the invention has particular utility when used in a matching type game or instructional device wherein the first set of parts is comprised of a plurality of coded receivers contained in a gameboard and the second set of parts consists of a set of coded plugs or the like randomly insertable in the receivers with the receivers each having a question somehow associated with it and with the plugs each having an answer somehow associated with it, or vice versa. The invention also has utility in a locking system wherein the first set of parts is comprised of a set of receivers in the form of locks and the second set of parts is a set of plugs in the form of keys. Therefore, for convenience the invention is disclosed and described herein as embodied in both a game device and in a lock and key system, but it is to be understood that the invention is not limited to such applications and that it may instead be used in other applications requiring or lending themselves to the use of a combination system.

Various objects and advantages of the invention will be apparent from the following detailed description and the accompanying drawings.

SUMMARY OF THE INVENTION

The invention concerns a combination system made up of a first set of parts or receivers and a second set of parts or plugs which plugs are randomly insertable in the receivers.

The receivers each have a plurality of coding features, and the plugs each have a similar plurality of coding features which are cooperable with the coding features of a receiver when a plug is inserted into a receiver, the cooperation being such that a given condition is achieved only if the code of the receiver coding features matches the code of the plug coding features.

The invention itself resides in the coding of the receivers and of the plugs being preformed in accordance with rules, derivable from N-dimensional geometry, to the effect that: (a) each receiver and each plug have the same number of coding features; (b) each coding feature has associated with it a quantity nL, where L is a unit quantity and n is an integer chosen from the set 0 to X; and (c) for each receiver and each plug the sum of the quantities nL associated with its coding features is equal to a constant K.

BRIEF DESCRIPTION OF THE DRAWINGS

FIG. 5 is a diagram illustrating the various code combinations available in accordance with the invention for a given set of coding parameters.

DETAILED DESCRIPTION OF THE PREFERRED EMBODIMENTS

Figure 1:
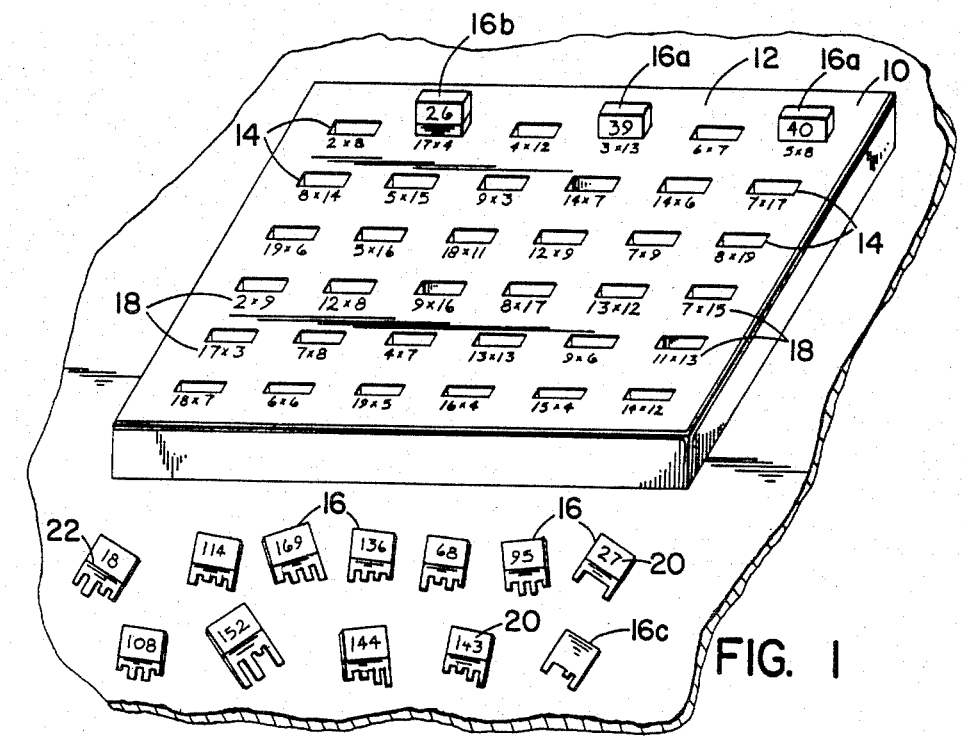
FIG. 1 is a perspective view of a matching game embodying the present invention.
Figure 2:
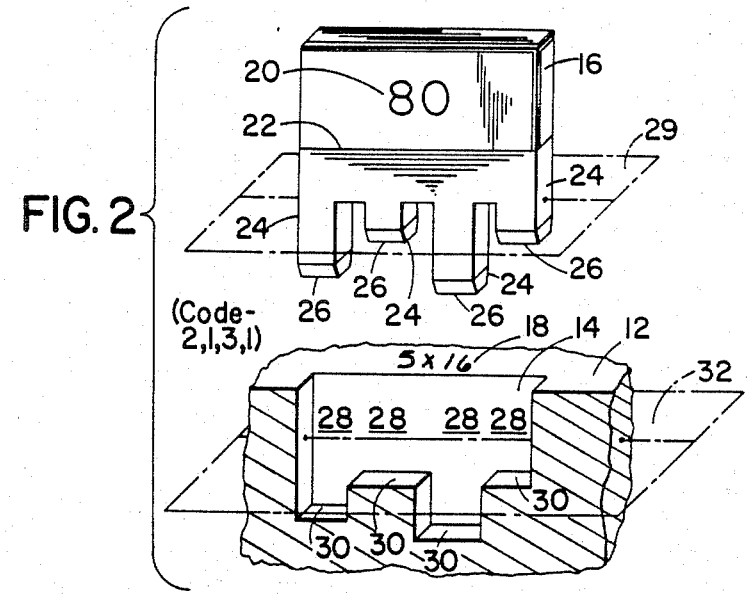
FIG. 2 is a fragmentary perspective view partly in section showing one of the plugs of FIG. 1 and its matching receiver.

Referring to FIGS. 1 and 2, these figures show a matching game embodying the combination system of the present invention. The game includes a gameboard 10 having a flat upper surface 12 and containing a plurality of slot-like receivers 14, 14 communicating with the upper surface. Also included in the game are a plurality of plugs or keys 16, 16 (not all of which are shown in FIG. 1) each of which may be randomly inserted into any one the receivers 14, 14. Associated with each receiver 14 is a mark or indicia, such as indicated at 18, 18, with the indicia of each receiver being different from that of any other receiver. Likewise, each plug 16 has associated with it a mark or indicia, such as indicated at 20, with the indicia 20 of each plug being different from that of any other plug. The purpose of the game is to match the indicia 18 of a receiver 14 with the indicia 20 of a plug 16. Therefore, the indicia 18, 18 and the indicia 20, 20 have a question-answer relationship to one another. In the illustrated example of FIG. 1 the game is shown to be used for teaching multiplication and in line with this each indicia 18 is in the form of a multiplication question and each indicia 20 is in the form of a multiplication answer. Of course, the roles of the indicia could be reversed with the indicia associated with the receivers being answers and those associated with the plugs being questions.

The receivers 14, 14 each contain a plurality of coding features which are coded in a way described in more detail below. Each of the plugs 16 likewise includes a similar plurality of coding features which are also coded as described in more detail hereinafter. The coding features of the receivers and the coding features of the plugs are such that when a plug is inserted in a receiver the plug will fit fully into, or be fully accepted by, the receiver if the code of the plug matches the code of the receiver. For example, in FIG. 1 the two plugs 16a, 16a inserted in the gameboard have codes matching the codes of their receivers and therefore they fit fully into their receivers. On the other hand the plug 16b has a code not matching that of its receiver and therefore it does not fit fully into its receiver.

Preferably, some indicating means is provided to aid in distinguishing a full fit or acceptance from a non-full fit or nonacceptance. In FIG. 1 such means is provided by painting or otherwise coloring each plug 16 two different colors separated by a dividing line 22, the line 22 being so located on the plug that it will be located flush with the top surface 12 of the gameboard if the plug is fully received in its receiver. It might also be noted here that a feature of the coding system of the invention is that the furthest possible degree of insertion of a plug into a receiver occurs when the codes of the receiver and plug match one another. If the codes do not match the plug will always extend further upwardly out of the gameboard 12 so that the line 22 will be visibile to indicate a mismatch.

Of course, the indicia 18, 18 of the receivers and the indicia 20, 20 of the plugs are so arranged on the gameboard and on the plugs that when the correctly coded plug is inserted in a receiver the indicia 20 of that plug will supply the correct answer to the indicia 18 of the receiver. In playing the game a player will read one of the question indicia 18, 18 on the gameboard and will then try to find the correct answer among the answer indicia 20, 20 of the plugs 16, 16. When he has made a selection of a plug which he believes contains the proper answer indicia he can check the correctness of the selected answer by inserting the selected plug in the receiver in question. If the plug fits fully into the receiver the selected answer is verified as the correct one. If the selected plug does not fit fully into the receiver the player will know he has made a wrong selection, that is, has answered the question incorrectly.

Before continuing with the detailed description of the game of FIGS. 1 and 2 consideration is now given to the broad coding system of the invention a specific embodiment of which is constituted by the game of FIGS. 1 and 2. The coding system is based on N-dimensional geometry but can also be given a nongeometric explanation, and both such explanations are presented below.

With regard to the geometric explanation, each piece (each receiver and each plug) of the combination system has a number N of coding quantities somehow associated with it. The number N of coding quantities may vary from system to system but within a given system the number N is the same for all pieces.

Each coding quantity of each piece can in turn be any one of a number of amounts nL, where L is a unit quantity and n is an integer chosen from the set 0 to X. X may vary, but in most practical applications X will be a small integer such as 3, 4 or 5. If, for example, for a given system X is chosen to be 3, then each coding quantity of a piece can take on any one of four values, namely: 0, L, 2L and 3L.

The coding quantities of a piece are further taken to be the components of vectors in N-dimensional space. The vectors used are only those which end in a chosen hyperplane in that space. What defines a hyperplane in N-dimensional space is that the sum of the components along each axis of the vectors making up the hyperplane add up to a constant, K. Thus a hyperplane in N-dimensional space is made up of all the vectors satisfying the condition that $v_1 + v_2 + v_3 + v_4 \ldots + v_n = K$, where $v_i$ is the component of the vector in the ith dimension, that is along the ith axis. Therefore, to meet the requirement that the coding quantities of a piece define a vector ending in a chosen hyperplane in N-dimensional space the coding quantities of a piece are so chosen that their sum is equal to a constant K. That is, for each piece of the system its coding quantities add up to the constant K.

Since it is difficult or impossible to visualize four-dimensional space, five-dimensional space or any space of a higher order than three dimensional space, it is instructive to see how a coding system would be formed in three-dimensional space which can be visualized.

Figure 3:
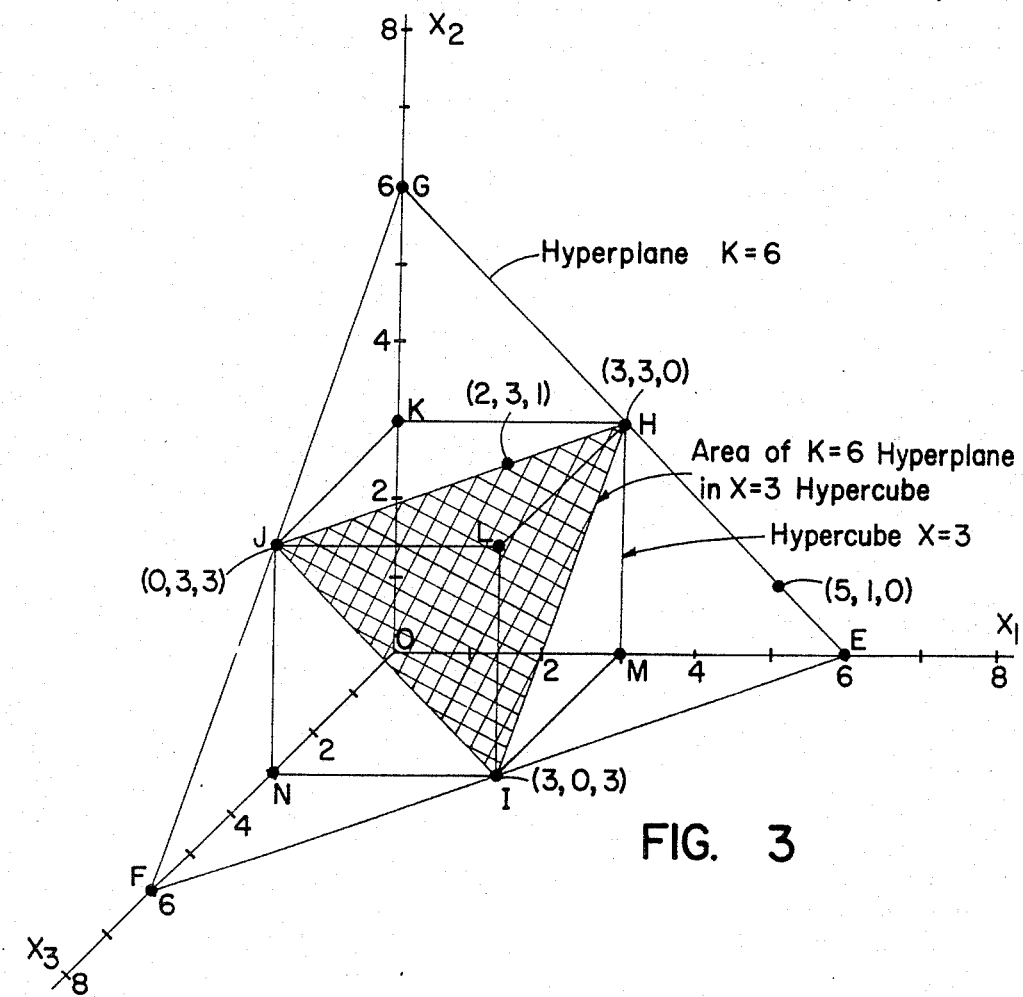
FIG. 3 is a diagram useful in explaining the N-dimensional derivation of the coding scheme used in the invention.

FIG. 3 is such a three-dimensional representation. In three-dimensional space, a hyperplane is called simply a plane and a hyperplane (or plane) for K=6 is shown by the line GFEG. That is, any vector drawn from the origin 0 and ending in the hyperplane K=6 will have vector components $v_1$, $v_2$ and $v_3$, such that $v_1 + v_2 + v_3 = 6$.

In three-dimensional space a hypercube is simply a cube, and in FIG. 3 the X=3 hypercube (or cube) is shown with corners at H, I, L, K, M, N, and O. This hypercube is one which is three units long on each side and has one corner at the origin 0. As can be seen from FIG. 3, the K=6 hyperplane intersects the X=3 hypercube and that a portion of the hyperplane is located within the hypercube. In accordance with the coding scheme of the invention only those vectors are used which end on that portion of the hyperplane located within the hypercube. For example, in FIG. 3 the vectors with components (0, 3, 3), (2, 3, 1), (3, 3, 0) and (3, 0, 3) all fall on the K=6 hyperplane and are also included in the X=3 hypercube and are therefore acceptable for coding purposes. The illustrated vector (5, 1, 0) also falls on the K=6 hyperplane but it is located outside of the X=3 hyperplane and is therefore not used for coding purposes.

Now, although higher order space than the three-dimensional space of FIG. 3 cannot be visualized, the same coding principles hold for such higher order space. For example, in a five-dimensional space there will for example be a K=8 hyperplane such that all vectors drawn from the origin and ending in that hyperplane have components $v_1 + v_2 + v_3 + v_4 + v_5 = 8$. There will also be a hypercube, such as an X=3 hypercube, having one corner at the origin and with each side of three units length which hypercube intersects the K=8 hyperplane. Therefore, in connection with such five-dimensional space a coding scheme can be used in practicing the invention wherein the coding quantities are related to the components of vectors ending in that portion of the K=6 hyperplane includes within the X=3 hypercube.

Although the coding scheme, as described above, has a basis in N-dimensional geometry, it can also be stated in nongeometric terms as follows by merely giving the rules of the coding scheme without reference to their N-dimensioanl derivation. These rules are:

(a) each piece (each receiver and each plug) of the combination system has the same number N of coding quantities;

(b) each coding quantity has a value nL where L is a unit quantity and n is a integer chosen from the set 0 to X (that is, a value of 0, L, 2L, . . . or XL); and (c) for each piece the sum of its coding quantities is equal to a constant K.

The features of a piece used as the coding means and the nature of the related coding quantities may vary widely without departing from the invention. In some embodiments the coding may be of an analog nature wherein, for example, the coding features are surfaces on the pieces and the coding quantities are lengths or displacements, such as the displacements of such surfaces from a given datum plane. In other embodiments, however, the coding may be of a digital nature whereby, for example, a coding quantity may be a numerical representation magnetically or otherwise stored on the piece.

In the embodiments described herein, the coding is of an analog nature. Referring again to the embodiment of FIGS. 1 and 2, and as seen best in FIG. 2, each plug 16 has four prongs 24, 24 the end surfaces 26, 26 of which constitute the coding features. The coding quantities are in turn the displacement of each end surface 26 from a given datum plane which, for example, may be taken to be the illustrated plane 29 perpendicular to the longitudinal axes of the prongs. The coding quantities may therefore be viewed as being the lengths of the four prongs. Similarly, each receiver 14, represented by the one shown in FIG. 2, has four zones 28, 28 each of which receives a respective one of the prongs 24, 24 when the prong 16 is inserted in the receiver. The coding features of the receiver are end walls 30, 30 located at the inner ends of the zones 28, 28 and the coding quantities are the displacements of the end walls 30, 30 from a given datum plane 32 perpendicular to the longitudinal axes of the zones 28, 28.

In accordance with the coding rules given above, in the system of FIGS. 1 and 2, $N=4$, $X=3$ and $K=7$. That is, $N=4$ means that each plug 16 has four coding quantities represented by the lengths of the four prongs 24, 24, or more specifically by the displacement of the prong end walls 26, 26 from the datum plane 29, and each receiver 14 has four coding quantities represented by the lengths of the four zones 28, 28, or more particularly by the displacement of the zone end walls 30, 30 from the datum plane 32. As to the parameter $X=3$ this means that each prong 24 of a plug 16 can have a maximum length of three units, and likewise the relevant length of each zone 28 also has a maximum length of three units. A larger maximum length could have been chosen, but limiting the maximum prong length to three units prevents the prongs from being too long and makes them less likely to be broken.

As to the parameter $K=7$, this means that for each plug 16 the sum of the lengths of its prongs equal seven units and likewise for each receiver 14 the sum of the relevant lengths of its recesses 28, 28 also equals seven.

In FIG. 2 the illustrated plug 16 and the illustrated receiver 14 are ones having matching codes and therefore also having matching indicia 18 and 20. The lengths of the prongs, going from left to right in FIG. 2, are 2, 1, 3 and 1 units, respectively, and likewise the lengths of the relevant portions of the zones 28, 28 are also 2, 1, 3 and 1 unit, respectively. Thus, the lengths of the prongs 24, 24 add up to seven and the lengths of the relevant portions of the zones 28, 28 also add up to seven, and the same condition exists for all of the plugs 16, 16 and receivers 14, 14 of the game but with the particular combination or code being different for each of the plugs and different for each of the receivers with there being only one plug having the same code as each receiver. For the given parameters used in FIGS. 1 and 2 of $N=4$, $X=3$ and $K=7$, the available combinations are shown in FIG. 5, from which it can be seen that these parameters allow for forty-eight different combinations or codes.

As will be apparent from FIG. 2, when the illustrated plug 16 is inserted in the illustrated receiver 14 all of the prong end surfaces 26, 26 will engage their associated zone end walls 30, 30 and will thereby cause the plug to be fully accepted by the receiver so that the line 22 on the plug will be positioned flush with the top surface 12 of the gameboard. It will also be apparent that if a plug with some other code is inserted into the illustrated receiver 14 of FIG. 2 this condition will not exist and instead one or more plug end walls 26, 26 will fail to engage their associated end walls 30, 30 and the plug will be not fully accepted by the recess so that the line 22 will be positioned above the board top surface 12.

When the plugs and receivers have rectangular cross sections such as shown in FIGS. 1 and 2 it may be possible to insert a plug in a receiver in the wrong orientation. Preferably some means is provided to prevent or inhibit this, and in the game of FIGS. 1 and 2 such means consists of providing the indicia 20 of each plug only on the front face of the plug with the rear face of each plug being solidly colored and containing no indicia as illustrated by the plug 16c of FIG. 1. Therefore, if a plug is always inserted into a receiver with its indicia 20 or front face facing forwardly its orientation will be correct.

Figure 4:
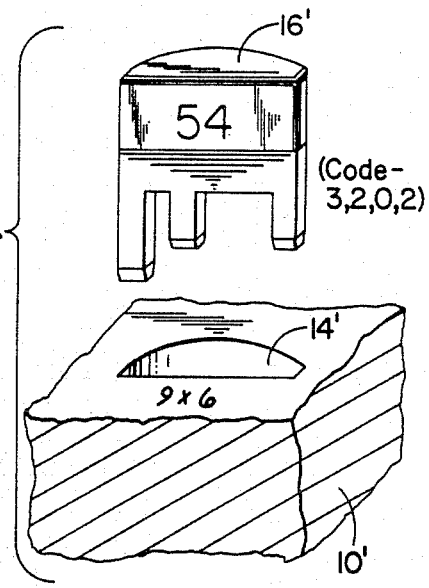
FIG. 4 is a view similar to FIG. 2 but showing another style of receiver and plug.

The plugs and receivers may also be shaped so as to prevent the plugs from being inserted into the receivers in anything but the correct orientation. Such a system is shown in FIG. 4 which may be identical with that of FIGS. 1 and 2 except that each plug 16' has a nonsymmetrical cross section and each receiver 14' has a corresponding nonsymmetrical cross section allowing the plug to be inserted into the receiver only in the correct orientation.

Figure 6:
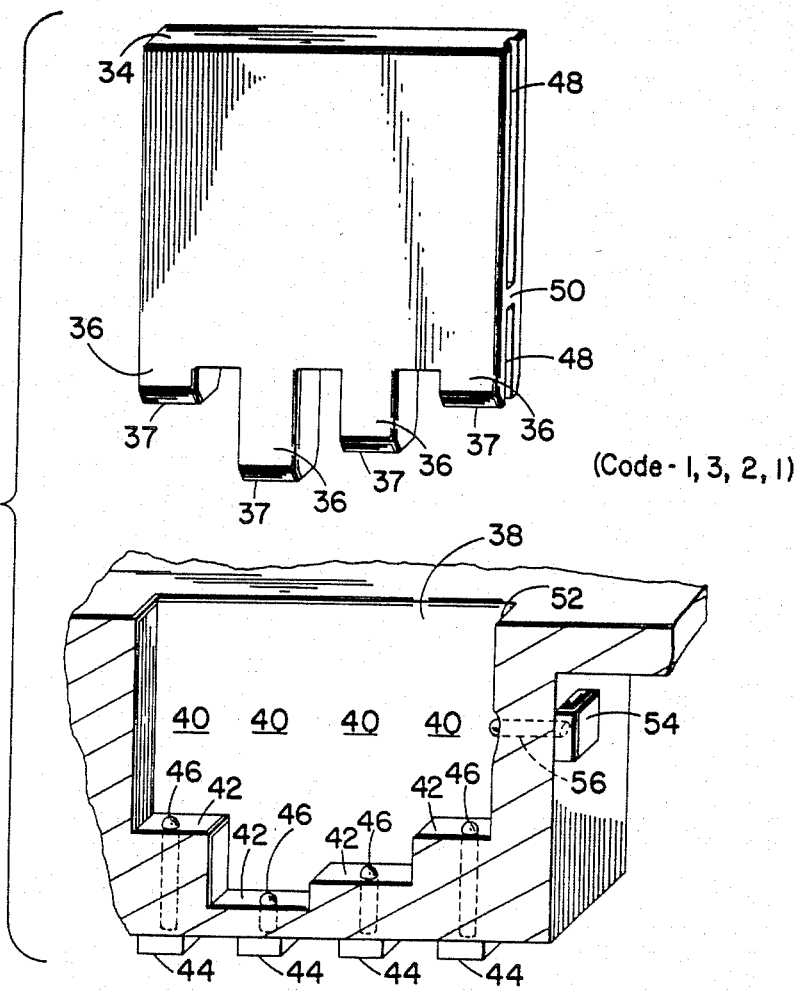
FIG. 6 is a perspective view, partly in section, showing another form of receiver and plug which may be used in either a game device or locking system embodying the invention.

FIGS. 1 and 2 show a simple mechnical game embodiment of the invention, but the coding system of the invention can be used in much more complicated devices and, for example, can be readily used in a system of locks and keys. By way of example FIG. 6 shows another construction of plug and receiver which may be used for either a game device or a lock and key situation. Referring to FIG. 6 the illustrated plug 34 is quite similar to one of the plugs 16 of FIGS. 1 and 2 and has four coding prongs 36, 36; and the receiver 38 is generally similar to one of the receivers 14 of FIGS. 1 and 2 and has four zones 40, 40 each associated with a respective one of the prongs 36, 36 of a plug 34. At the bottom of each zone 40 is an end wall 42. As in FIGS. 1 and 2, the positions of the prong end walls 37, 37 of the plug 34 and positions of the zone end walls 42, 42 of the receiver are coded and if the code of the plug 34 matches the code of the receiver 38, as it does in FIG. 6, when the plug is inserted into the receiver each of the prong end walls 37, 37 will engage its associated zone end wall 42, 42 of the receiver.

Unlike the more simple system of FIGS. 1 and 2, the system of FIG. 6 includes means for providing signals indicating the engagement of a prong end wall with its zone end wall and also for indicating the full acceptance of a plug in a receiver. The means for signaling full acceptance need not be provided in all cases, but it adds an additional degree of security against an improper plug being erroneously accepted as a matching one.

The means for indicating the engagement of a prong end wall 37 with its associated zone end wall 42 in the construction of FIG. 6 comprises a switch 44 associated with each zone 40 and having an operating member 46 penetrating slightly beyond the associated zone end wall 42. Each switch 44 is normally open but is closed when a prong end wall 37 is brought into contact with the associated end wall 42 and associated switch operating element 46.

To provide a signal indicating the full acceptance of a plug 34 in a receiver 38 each plug of the system, as illustrated by the representative one of FIG. 6 has a groove 48 extending along one vertical edge interrupted by a bridge 50. Each receiver 38 of the system, as represented by the one shown in FIG. 6, also has associated with its corresponding vertical side wall 52 a switch 54 operated by an operating member 56 having its free end projecting slightly beyond the side wall 52. The switch 54, its operating member 56 and the bridge 50 on each plug are so located that if the plug is fully received in the receiver the bridge 50 will contact the switch operating member and close the normally open switch 54. Of course, if the plug is not fully received in the receiver the bridge 50 will be located away from the operating member 56 and the switch 54 will remain open.

Figure 7:
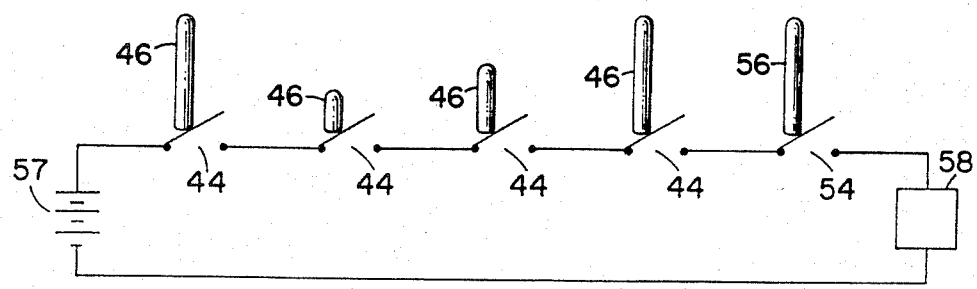
FIG. 7 is a circuit diagram of an electrical circuit associated with the receiver of FIG. 6.

A circuit for the switches associated with the illustrated receiver 38 of FIG. 6 is shown in FIG. 7 from which it can be seen that the four switches 44, 44 and the one switch 54 are all connected in series with one another, with a voltage source 57 and with a load element 58.

It will be understood that in a combination system employing the plug and receiver construction of FIG. 6 there will be a plurality of receivers such as shown at 38 and a plurality of plugs such as shown at 34, and each receiver will have associated with it a circuit such as that shown in FIG. 7. If the system is embodied in a game device then the load element 54 may, for example, be a lamp or buzzer which gives a visual or audible indication when a plug of proper code is inserted in a receiver. In a lock and key system, each receiver 38 may be a lock or part of a lock, each plug 34 may be a key, and the load element 58 of each receiver electrical circuit may be a solenoid operating a bolt which is withdrawn when the solenoid is energized by the closure of all of the switches 44, 44 and 54 to open a door or other part with which the lock may be associated.

I claim:

1. A combination system comprising:
   a set of first parts each having the same given number of coding features and a related given number of coding quantities providing each such first part with a combinational code, and
   a set of second parts each having said same given number of coding features and a related number of coding quantities providing each such second part with a combinatoinal code,
   said coding features of said first parts cooperating with said coding features of said second parts in such a way that when a selected first part is combined with a selected second part a given condition will be attained only if said combinational code of said first part matches said combinational code of said second part,
   each of said first and second parts being coded according to the rules:
   (a) each coding quantity has a value nL, where L is a unit quantity and n is an integer chosen from the set 0 to X and
   (b) the sum of the coding quantities of a part is equal to a constant K.

2. A combination system as defined in claim 1 further characterized by X being greater than one.

3. A combination system comprising:
   a plurality of plugs each having a plurality of separate coding portions each of which portions contains a discrete coding feature, and
   means defining a plurality of receivers each adapted to insertably receive at least the part of any one of said plugs containing its coding portions, each of said receivers having a number of coding zones equal in number to the number of said coding portions of each of said plugs and each of which coding zones is capable of receiving a respective one of said coding portions of a plug when such plug is inserted into the receiver,
   each of said coding zones having a coding means cooperable with the coding feature of a plug coding portion received therein,
   said coding feature of said plugs being length coded according to the rules:
   (a) the displacement of each coding feature from a given datum plane fixed relative to the plug is nL, where L is a unit of length and n is an integer chosen from the set 0 to X and
   (b) the sum of the displacements of all of the coding features of the plug from the associated datum plane is equal to a constant K,
   each of said coding means of said receivers having a feature with a related coding length and said coding lengths of the coding means of each receiver being length coded according to the rules:
   (a) each of said coding lengths is nL, where L is the aforesaid unit length and n is an integer chosen from the set 0 to X, and
   (b) the sum of said coding lengths of all of said coding means of the receiver is equal to said constant K.

4. A combination system as defined in claim 2 further characterized by X being greater than one.

5. A combination system as defined in claim 3 further characterized by said coding portions of a plug and said coding means of a receiver being adapted to be brought into cooperation with one another, if the length code of the plug matches the length code of the receiver, as a result of movement of the plug into the receiver in the plug insertion direction, and cooperating means on each plug and associated with each receiver for indicating when a plug has been inserted to a given degree into a receiver.

6. A combination system as defined in claim 3 further characterized by said receivers and said plugs all being part of a matching game wherein all of said receivers are contained in a gameboard, each of said receivers having a length code matching the length code of a respective one of said plugs, each of said receivers and its plug of matching length comprising a matched pair of coded parts one of which parts bears question indicia and the other of which parts bears correct corresponding answer indicia so that when a plug is inserted in a receiver the correctness of the correspondence between the related question and answer indicia can be determined by the existence or nonexistence of a match between the length code of the plug and the length code of the receiver.

7. A combination system comprising:
   a plurality of plugs each having a plurality of prongs with each prong lug having an end wall and with all of said plugs having the same number of prongs, and
   means defining a plurality of receivers each adapted to insertably receive at least the portion of any on of said plugs containing its said prongs, each of said receivers having a number of zones equal in number to the number of prongs on each of said plugs each of zones receives a respective one of the prongs of a plug when such plug is inserted into the receiver, and each of said zones having an end wall engageable with the end wall of a prong received therein provided the prong has sufficient length, said prongs of said plugs being length coded according to the rules:
(a) the length of each prong from a given datum plane fixed relative to the plug is nL, where L is a unit of length and n is an integer chosen from the set 0 to X, and
(b) the sum of the lengths of all of the prongs of the plug is equal to a constant K,
said zone end walls of each of said receivers also being length coded according to the rules:
(a) the displacement of each of said zone end walls from a given datum plane fixed relative to said receiver is nL, where L is the aforesaid unit length and n is an integer chosen from said set 0 to X, and
(b) the sum of all of said end wall displacements of the receiver is equal to said constant K.

8. A combination system as defined in claim 7 further characterized by said plugs each being adapted to be inserted into a receiver in one direction along a first axis of insertion fixed relative to the plug when such axis is aligned with a corresponding second axis of insertion fixed relative to the receiver, said end walls of said prongs of each plug being located at the forward end of said prongs with rspect to said one direction and arranged generally perpendicular to said first axis of insertion, and said end walls of said receiver zones being arranged generally perpendicular to said second axis of insertion and facing rearwardly with respect to said one direction so that said end walls of said prongs are engaged by the corresponding end walls of said receiver if the length code of the prong of the inserted plug match the length code of the end walls of the receiver.

9. A combination system as defined in claim 8 further characterized by said plugs and said receivers being of such cross sectional shapes on planes perpendicular to said first and second axes of insertion respectively that each plug is inserted in a receiver only when oriented at a given angular position about said second axis of insertion.

10. A matching game comprising:
a gameboard having a plurality of receivers, and
a plurality of plugs each insertable in any one of said receivers of said gameboard,
each of said receivers having an indicia associated with it and each of said plugs likewise having an indicia associated with it, said indicia of said receivers being different from one another, said indicia of said plugs being different from one another, and said indicia of said receivers and said indicia of said plugs being so related that the indicia of each receiver matches the indicia of a respective one of said plugs with a "question-correct answer" relationship,
each of said plugs having a plurality of prongs all extending in the same direction relative to the plug and each terminating in a forward end wall,
each of said receivers having a number of zones equal in number to the number of prongs of each of said plugs and each of which zones receives a respective one of said prongs of a plug when a plug is inserted into a receiver, and each of said zones having an end wall engageable with the end wall of a prong received therein provided the prong has sufficient length,
said prongs of each plug being length coded according to the rules:
(a) the length of each prong is nL, where L is a unit of length and n is an integer chosen from the set 0 to X, and
(b) the sum of the length of all of the prongs of the plug is equal to a constant K,
the prong length code of each of said plugs being different from that of all other of said plugs,
said zone end walls of each of said receivers also being length coded according to the rules,
(a) the length of each zone from its said end wall to a given datum plane is nL, where L is said aforesaid unit of length and n is an integer chosen from said set 0 to X, and
(b) the sum of said lengths of all of said zones is equal to said constant K,
the length code of each of said receivers matching the prong length code of that plug which is associated with said receiver through the indicia associated with said prong and said receiver so that when the plug whose indicia matches with the indicia of a receiver is inserted in that receiver the prong length code of that plug will also match the end wall length code of the receiver.

* * * * *